July 25, 1961    A. FRIEDRICH ET AL    2,993,320
APPARATUS FOR PROCESSING AGRICULTURAL PRODUCTS
Filed July 21, 1958    5 Sheets-Sheet 1

INVENTORS
ALBERT FRIEDRICH
HEINRICH G. F. ROESSLER
GEORG F. FUEGLEIN
ALBERT L. SENG
BY Dicke and Craig
ATTORNEYS

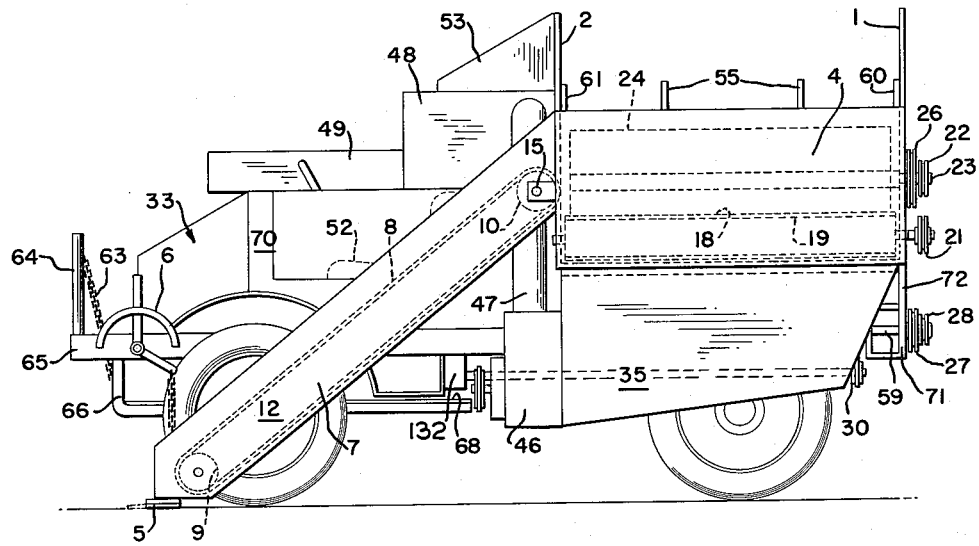
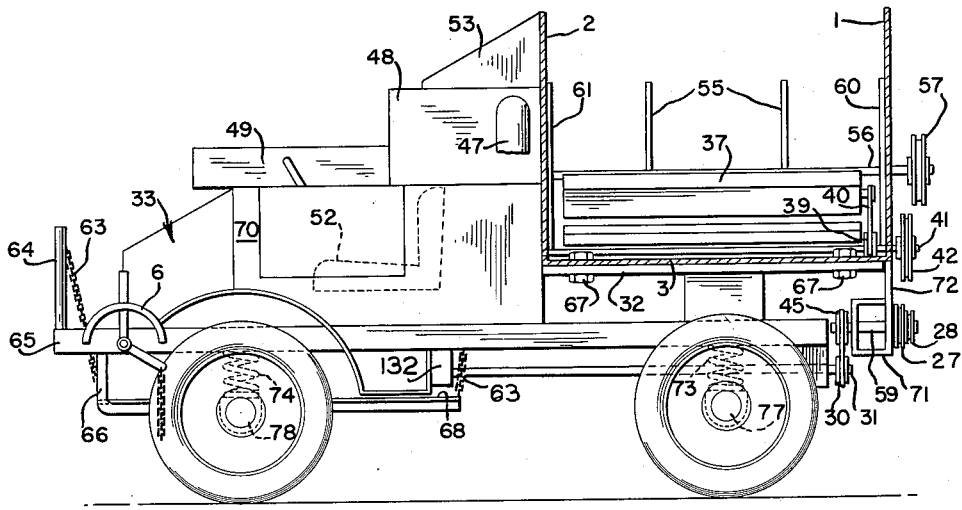

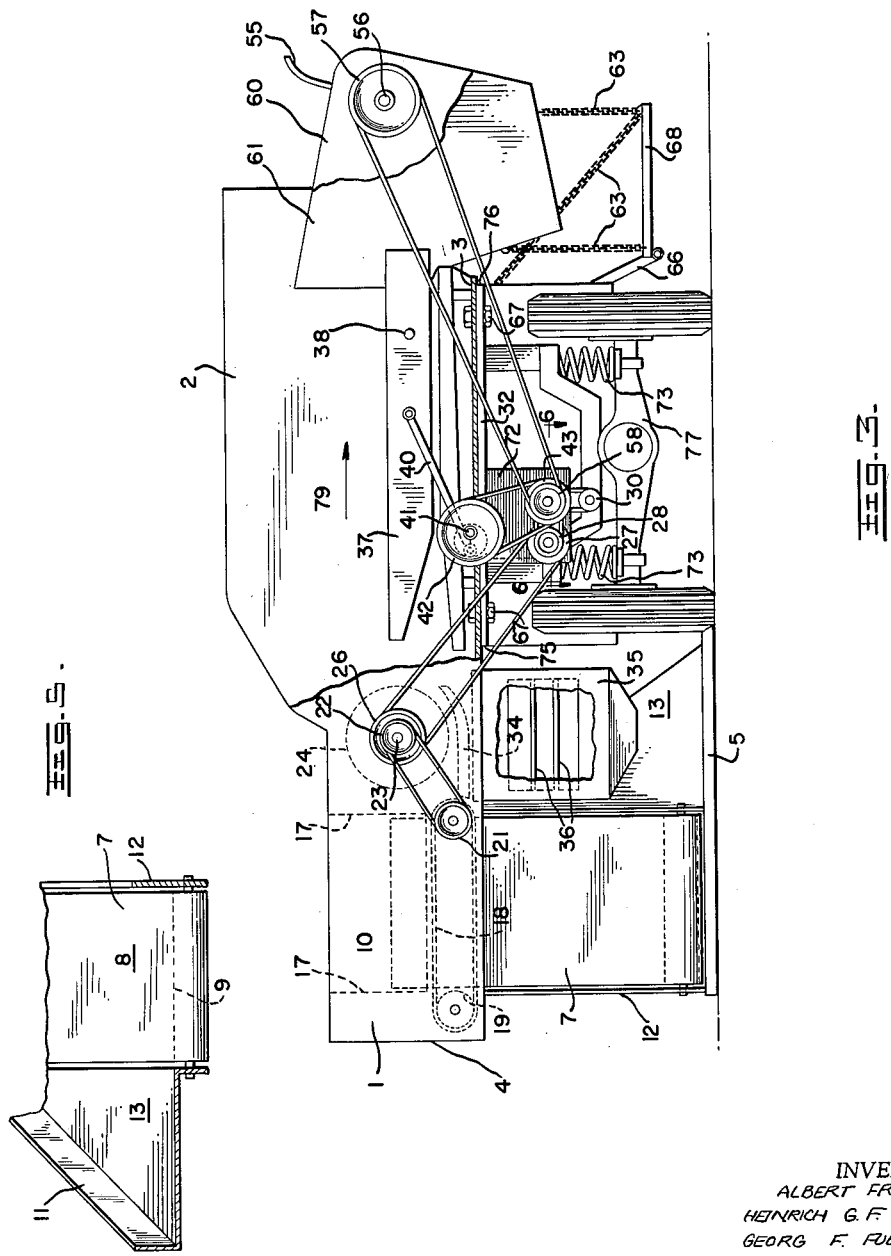

INVENTORS
ALBERT FRIEDRICH
HEINRICH G. F. ROESSLER
GEORG F. FUEGLEIN
ALBERT L. SENG
BY Dieke and Craig
ATTORNEYS INVENTORS
ALBERT FRIEDRICH
HEINRICH G. F. ROESSLER
GEORG F. FUEGLEIN
ALBERT L. SENG
BY Dicke and Craig
ATTORNEYS

United States Patent Office 2,993,320
Patented July 25, 1961

2,993,320
APPARATUS FOR PROCESSING AGRICULTURAL PRODUCTS
Albert Friedrich, Baden-Baden, Heinrich G. F. Roessler, Gaggenau, Baden, Georg F. Fueglein, Goppingen, and Albert L. Seng, Faurndau, Kreis Goppingen, Germany, assignors to Daimler Benz Aktiengesellschaft, Stuttgart-Unterturkheim, Germany
Filed July 21, 1958, Ser. No. 749,728
Claims priority, application Germany May 30, 1953
9 Claims. (Cl. 56—20)

The present invention relates to self-propelled combine harvesters such as reapers, threshers, and other grain processing apparatus, as well as straw chopping machines, of which the following is a continuation-in-part application of Serial No. 433,728, filed in the United States Patent Office on June 1, 1954, now abandoned. Threshing machines usually consist of a reaper, a thresher, and a straw press which are combined with a motor to form a mobile or self-propelled unit. Inasmuch as machines of this type are used only for a short period of time during the year, they are rather uneconomical and expensive. On the other hand, motor vehicles, and especially tractors, are now required extensively in agriculture. It is, therefore, the object of the present invention to utilize motor vehicles more fully and economically for agricultural purposes, and more particularly, for mounting, carrying, and driving machines of the type mentioned above.

More specifically, it is an object of the invention to provide a motor vehicle, such as a general purpose truck or tractor which is especially designed so as to support and drive harvesting machines constituting what is customarily called a combine, but in a manner permitting them to be quickly and easily attached or detached and unloaded from the motor vehicle so as to permit either the vehicle or any of the machines to be used separately.

An important feature of the invention thus resides in the combination of a motor vehicle, particularly a general purpose tractor, which has a loading surface behind the driver's seat, with a reaper and an elevator driven by the motor vehicle, and the necessary machinery for processing the harvested material mounted on the loading surface in such a manner that the vehicle and the harvesting machinery may be disconnected from each other so as to be used independently.

Further objects, features, and advantages of the invention will be apparent from the following description and the accompanying diagrammatic drawings, in which:

FIGURE 2 is a side elevation view;

FIGURE 3 is a rear elevation view;

FIGURE 4 is a side elevation view with some parts removed;

FIGURE 5 is a cross section along line 5—5 of FIGURE 1;

Figure 1:
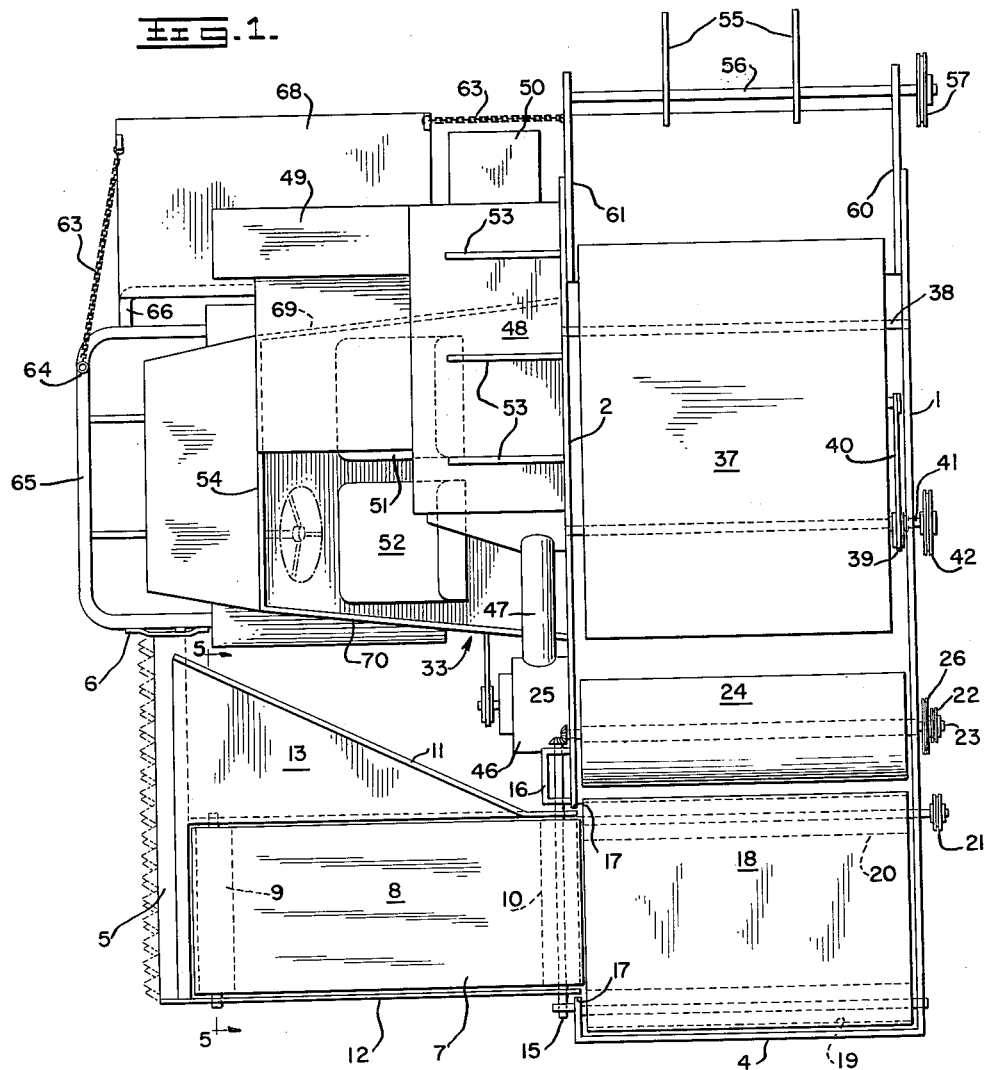
FIGURE 1 is a top view showing the disposition of the elements of the combine when mounted on a vehicle.
Figure 6:
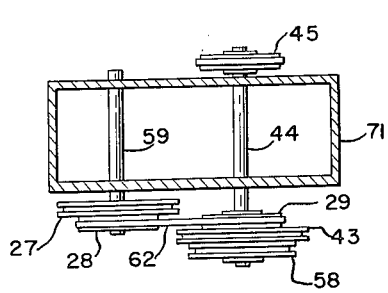
FIGURE 6 is an enlarged fragmentary sectional view along line 6—6 of FIGURE 3.

As illustrated in the drawings, with particular reference to FIGURES 1 to 6, a combine is mounted on the loading platform 32 of a tractor or truck 33. The combine components are adapted to be actuated by the conventionally driven power take-off shaft 31 of the tractor or truck and the combine is detachably secured to the loading platform by well-known fastening means as, for example, bolt and nut fastenings 67. This feature of detachability makes it possible for the vehicle, after the combine has been removed from the loading platform, to be used as a general purpose truck or tractor adapted for use in ordinary city street traffic. In such use, the loading platform 32 may be used for loading and transporting any desired material. As to the combine, after removal from the vehicle loading platform it is capable of being used entirely independently of the vehicle 33, since the elements of the combine comprise all those necessary for a threshing operation and it can be set up and be independently driven as a self-contained thresher unit wherever desired.

Considering the combine per se, it comprises a supporting frame structure having two parallel wall portions 1 and 2 connected by a bottom portion 3 and an end portion 4, the wall portions serving to support various components of the combine and the driving means therefor. The combine includes a reaper 5, shown diagrammatically, and which may be actuated by any conventional means, for example, by a mechanism similar to that shown in FIGURE 2 of Michel et al. Patent 2,269,828. The elevation of the reaper may be controlled by a device generally indicated by the reference numeral 6 and which includes a lever and a depending chain as shown in FIGURES 2 and 4 and which is generally similar to the corresponding device shown in FIGURE 1 of Pro Patent 1,727,616. The reaper 5, by means of a stationary part thereof forms a support for the lower end of an elevator conveyor 7 having a belt 8 connecting rollers 9 and 10. The conveyer 7 further comprises side walls 11 and 12 and a ramp 13 provided with a depending flange portion 14, the roller 9 being journalled in this flange portion and in wall 12, while roller 10 is provided with a shaft 15 which is journalled not only in walls 11 and 12 but in further supporting means 15 and 16 carried by the wall 2 as shown in FIGURE 1. The wall 2 is provided with an aperture, the vertical edges 17 of which are shown in FIGURE 1, the ends of the walls 11 and 12 projecting into the aperture. The elevator conveyer may be further provided with the usual reel (not shown) common to this art and exemplified by the Pro Patent 1,727,616 and the Heth Patent 2,507,669.

The forage material is deposited by the belt 8 onto the belt 18 of a transverse conveyer, belt 18 extending between rollers 19 and 20 journalled in walls 1 and 2 as indicated in FIGURES 1 and 3. Roller 20 is provided with a pulley member 21 which is belt-connected to pulley 22 on shaft 23 of thresher drum 24 journalled in walls 1 and 2. The other end of shaft 23 drives shaft 15 of roller 10 of the elevator conveyer through bevel gearing 25 shown in FIGURE 1. The driving means for shaft 23 comprises a pulley 26 thereon which is belt-connected through pulleys 27, 28 on shaft 59 and pulleys 29 and 45 on shaft 44 to pulley 30 on the power take-off shaft 31 of motor vehicle 33, as indicated particularly by FIGURES 3 and 6. As shown in these figures, pulleys 28 and 29 are connected by a belt 62, shafts 44 and 59 being journalled in a supporting structure 71 carried by a depending plate 72 integral with wall 1. In FIGURES 1, 2 and 4, the driving belts have been omitted for the sake of clearness.

The belt 18 of the transverse conveyer conveys the forage material to the aforesaid thresher drum 24 and concave 34 directly below which, supported by the aforesaid walls 1 and 2, is positioned a cleaning and separating device of conventional construction designated generally by the reference numeral 35 and comprising transverse sieves 36 as shown in FIGURE 3. The construction per se of this cleaning and separating device does not form the subject of the instant invention.

Laterally adjacent the thresher drum 24, a shaker 37 is mounted on a pivot shaft 38. The shaker is oscillated on this pivot shaft by a mechanism comprising an eccentric 39 and a link 40 pivotally connected to the shaker, and as shown particularly in FIGURE 1, this threshing element is disposed between the walls 1 and 2, the pivot shaft 38 being supported by these walls. The eccentric 39 is carried by a shaft 41 on which is secured pulley 42 belt-driven by a pulley 43 on shaft 44 which, as previously stated, is driven from power take-off shaft 31, the latter being conventionally driven and leading from diagrammatically represented casing 132.

From the cleaning and separating means 35, the threshed material is passed by means of a blower 46 and a conduit 47 to a further cleaning and separating unit 48, the blower for example being belt-driven from the power take-off shaft, and the threshed material being cleaned in the unit 48 by the air from the blower 46. The construction of the cleaning means of the unit 48 does not form the subject of the present invention and may be of any conventional design. The unit is provided with the usual discharge passages 49, 50 for grain and chaff, respectively, and is mounted, as shown in FIGURE 1, over and above the seat 51 next to the seat 52 of the driver of the motor vehicle 33. The unit is supported from the wall 2 by means of angle irons 53 and by the right side wall 69 of the motor vehicle, the unit resting on the top of the wall. Further support is furnished by the transversely extending member 54 between the walls 69 and 70 of the vehicle.

Secured to the walls 1 and 2 and adjacent the shaker 37 are the walls 60, 61 of a straw-cutting, binding and compressing unit 55 of conventional construction, of which the actuating shaft 56 is rotated by a pulley 57 belt-driven from pulley 58 on the aforesaid shaft 44.

As to the sizes of the pulleys in all of the above drives, these may be modified to meet individual requirements.

On the same side of the vehicle as the units 55 and 48 and adjacent thereto is mounted a bagging platform 68 where the properly threshed and cleaned grain is bagged, as indicated in FIGURE 1 is disposed below the grain passage 49 of the cleaning unit 48 for facilitating the bagging of the grain. The bagging platform as shown in FIGURES 1, 2, 3 and 4 is supported by chains 63 secured to three of its corners, two of the chains being fastened to the wall 61 of the unit 55 and the third to an upright support 64 mounted on the chassis-bumper part 65. The latter also has secured thereto a bar 66 extending downwardly and underneath the rear edge of the platform 68 to thereby furnish further support therefor.

As is obvious, chain and sprocket gearing could be employed to drive the various units instead of the belt and pulley gearing described.

Although in the embodiment of the invention illustrated, the reaper 5 is mounted laterally of the truck or tractor 33, this part of the combine may also be differently disposed relative to the vehicle, the elevating conveyor 7 then being modified accordingly.

The particular arrangement of the individual elements of the combine as illustrated in the drawings is chosen especially for mounting and using them on spring-supported vehicles, such as the truck or tractor 33, the chassis of which is supported on the wheel axes 77 and 78 by coil springs 73 and 74 as shown in FIGURES 3 and 4, such spring mounting resulting in a more uniform weight distribution of the various machine elements upon the wheel axles of such truck or tractor. When mounted upon the loading platform 32 of the tractor 33, some parts of the machinery and associated elements project over the edges 75 and 76 thereof as shown in FIGURE 3. In the preferred embodiment as illustrated in FIGURES 1 to 6, the threshing machine is mounted so that the harvested grain passes through the machine in a direction transverse to the longitudinal axis of the vehicle 33, as shown by arrow 79 in FIGURE 3.

FIGURE 3 further illustrates that the threshing machine and its associated elements together form a U-shape, as seen in the direction of driving, which is especially adapted to be received on the loading platform 32 of the vehicle, the arms of the U hanging down on either side of the platform, whereby the weight of the individual parts or units when mounted on the platform are distributed as evenly and uniformly as possible relative to the truck or tractor 33.

For separating and dismounting the threshing machine from the vehicle 33 so that either or both of them may be used as an independent unit, the bolt and nut fastening means 67 securing the thresher on the loading platform 32 of the truck or tractor 33 should first be disconnected and the thresher then unloaded therefrom by a suitable hoist (not shown), and set down upon a raisable support, likewise not shown, which is moved adjacent the rear of the vehicle. Then, the truck or tractor 33 may be driven away to carry out some other function, while the thresher may be operated by some other desired driving source. For remounting the threshing machine on the vehicle 33, the latter may simply be driven backwards until the loading platform 32 is located a certain distance underneath the threshing machine which, for this purpose, has been elevated slightly above the loading platform, and the machine is then pushed thereon into its proper place and set down, and finally secured to the vehicle by the aforesaid bolt and nut fastening means or by some other suitable locking mechanism.

Figure 7:
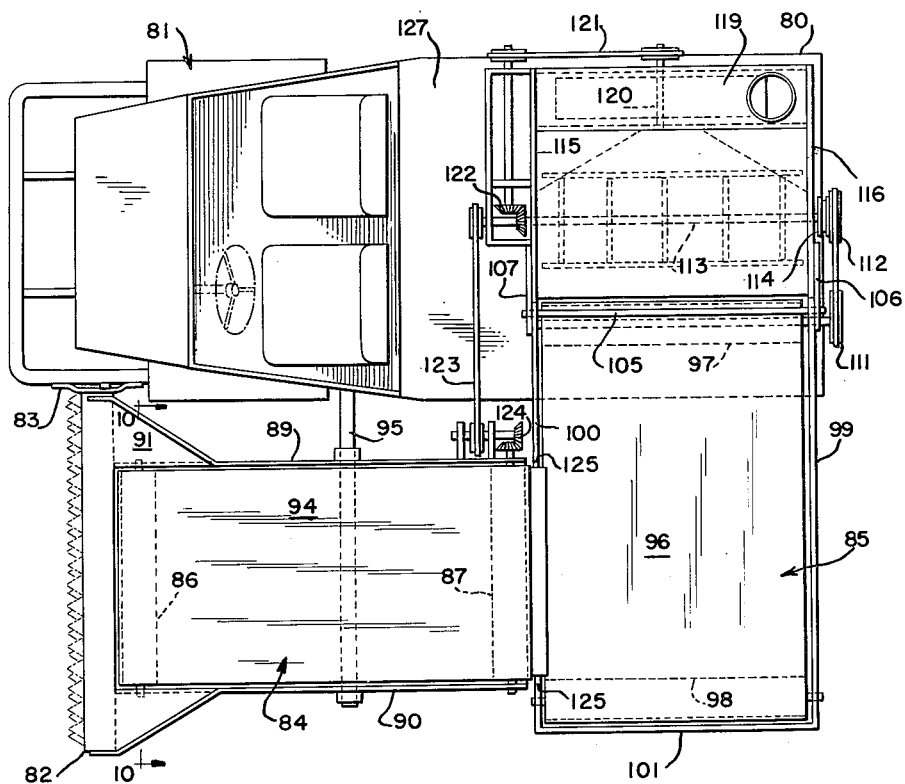
FIGURE 7 is a top view of another embodiment of the invention.
Figure 10:
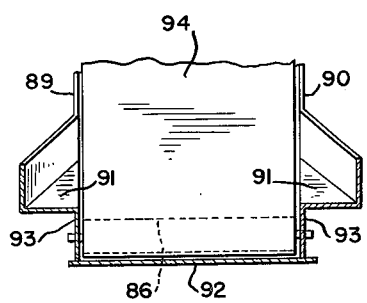
FIGURE 10 is a cross-sectional view along line 10—10 of FIGURE 7.
Figure 8:
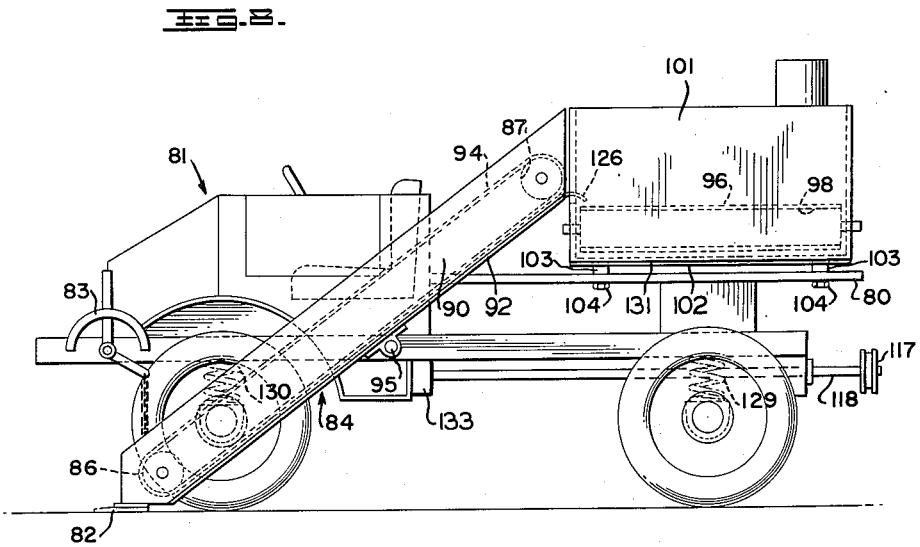
FIGURE 8 is a side elevation view.

In the embodiment of the invention diagrammatically illustrated in FIGURES 7, 8, 9 and 10, the loading platform 80 of a truck or tractor 81 has mounted thereon a chopping machine 88. The reaper 82 may be actuated by means similar to that of reaper 5 of the other embodiment of the invention and may be provided with similar controlling means 83. An elevator conveyor 84 leads from the reaper to a transverse conveyor 85 and as shown these conveyers are mounted so as to be disposed entirely on one side of the truck or tractor 81. The transverse conveyor passes the straw to the chopping machine 88 which cuts up the straw into fine chaff. The elevator conveyer 84 comprises a belt 94 which passes over rollers 86 and 87, the latter being driven from the chopping machine 88 in a manner to be later described. As shown in FIGURES 7 and 10, the elevator conveyor further comprises side walls 89, 90, ramps 91, and a bottom wall 92. At its lower end, the bottom wall 92 connects the diverging lower ends of the walls 89, 90. Connecting the ramps 91 with the bottom wall are members 93 which serve as supporting means for roller 86 as shown in FIGURE 8. The roller 87 is mounted in the walls 89, 90. The elevator conveyer 84 is mounted substantially at its center of gravity on a cross arm 95 secured to the vehicle 81 and extending transversely of its length. By such manner of mounting, the reaper 82 is substantially or entirely relieved of the load of the elevator conveyer and it is more easily possible to adjust the height of the reaper from the ground.

Figure 9:
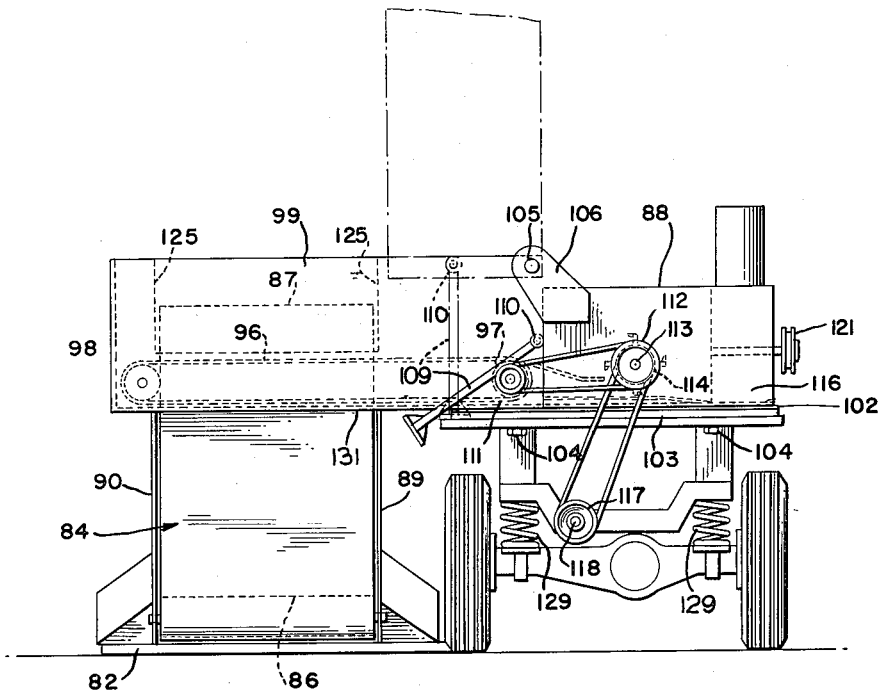
FIGURE 9 is a rear elevation view.

The transverse conveyer 85 previously referred to comprises a belt 96 connecting rollers 97, 98 which are journalled in parallel walls 99, 100 connected by a bottom wall 131 and an end wall 101 of a supporting frame as shown in FIGURES 7, 8 and 9. This frame is supported for part of its length by a foundation member 102 provided with supporting cross-pieces 103 which are detachably secured to the loading platform 80 of the vehicle 81 by nut and bolt fastening means 104. The frame is further provided with a shaft 105 extending through the walls 99, 100 and journalled in two supporting plates 106, 107 secured to the walls of the contiguous chopping machine 88 to be later referred to. As indicated in the dotted line representation in FIGURE 9, the frame can be swung about the shaft 105 to a vertical position in which the frame is additionally supported by a plate 109 swingably mounted on a shaft 110 extending between the walls 99, 100. Wall 100 is provided with an aperture of which the vertical edges 125 are to be seen in FIGURE 7, the aperture being provided for the passage of the straw carried up by the elevator conveyer 84, the bottom wall of the latter carrying a flexible lip member 126 spanning the slight spacing between the belt 94 and the inner face of wall 100. This spacing, shown to better advantage in FIGURE 8, is provided so that the elevator conveyer 84 may be readily dismounted from the cross arm 95. After such dismounting, this conveyer 10 and the reaper 82 may be disposed in collapsed condition in the loading platform space 127 in front of the chopping machine for easy transport by the truck or tractor 81. Preparatory to such transport, the transverse conveyer 85 may be swung to a vertical position as already explained.

The driving means for the transverse conveyer comprises a pulley 111 on the shaft supporting the roller 97, the pulley being belt-connected to a pulley 112 carried by the shaft 113 of the chopping machine 88 previously referred to. As previously described, wall 100 is apertured adjacent roller 87 of the elevator conveyer to permit the passage of the cut straw from the elevator conveyer to the belt 96 of the transverse conveyer. The belt carries the straw to the chopping machine 88 of which the chopping element, shown diagrammatically in FIGURE 9, is driven by a pulley 114 mounted on the shaft 113 which is journalled in walls 115 and 116. The construction of the chopping machine per se forms no part of the present invention and its elements are indicated more or less diagrammatically in FIGURES 7 and 9.

A blower 119 forms with the chopping machine a self-contained unit. As in the case of the chopping machine, the construction of the blower does not per se form a part of the present invention and it is diagrammatically represented in FIGURE 7. The shaft 120 of the blower is driven by belt and pulley gearing 121 actuated through bevel gearing 122 by shaft 113.

This shaft also forms part of the driving means for roller 87 of the elevator conveyor 84, being connected to this roller by means of belt and pulley gearing 123 and bevel gearing 124 as indicated in FIGURE 7.

As in the case of the embodiment of the invention shown in FIGURES 1 to 6, inclusive, the units described above are driven from a conventionally driven power take-off shaft 118 such as commonly provided in trucks or tractors. This shaft leading from diagrammatically indicated casing 133 is provided with the usual pulley 117 which is belt-connected with the pulley 114 on shaft 113 as shown in FIGURE 9, and thus by the belt and pulley gearing described above is enabled to drive the various units. For the sake of clarity some of the elements of this gearing are omitted from FIGURES 7 and 8.

It is obvious, as with the embodiment of the invention shown in FIGURES 1 to 6, inclusive, that chain gearing could be employed in place of belt gearing, if desired.

Since the motor vehicle 81 used for transporting and operating the conveyers and the chopping machine is likewise a general purpose, truck or tractor similar to the one shown in FIGURES 1 to 6, and having a spring-supported chassis, the springs 129 and 130 of such vehicle provide for a weight distribution of the different units relative to the wheels of the vehicle. The chopping machine 88 and the blower 119 form a self-contained unit which is mounted on the side of the loading surface 80 of the truck or tractor 81 opposite to the reaper 82 and the elevator conveyer 84. Thus, the weight of the different units of the entire machinery mounted on the vehicle is distributed evenly upon the loading surface 80.

It is understood that all connections between the various parts and elements of the combine which are removable, such as, for example, the connection between chain 63 and upright 64, etc., are of any suitable, conventional detachable type. This is true of all connections between the various elements shown in FIGURES 1 through 9 which are either interchangeable or detachable for purposes of the present invention.

While the foregoing description sets forth in detail what we regard as the preferred embodiments of our invention, it is to be understood that numerous changes may be made therein without departing from the spirit and scope of the invention as defined in the appended claims. For example, although we have described combines which include threshiing and straw chopping machines and associated apparatus, such combines may include any other agricultural machinery for harvesting and processing purposes of grain or any other agicultural product.

We claim:

1. The combination with a motor vehicle having front and rear axles, a loading platform, and a power take-off shaft, comprising a harvesting combine mounted on said loading platform and having a frame, and means detachably securing said harvesting combine to said loading platform, said harvesting combine comprising a first set of elements including a reaper, an elevator conveyer operatively associated with said reaper, a transverse conveyer, said elevator conveyer leading to said transverse conveyer, a thresher drum adjacent said elevator conveyer and operatively associated therewith, a first cleaning and separating device on said frame below said thresher drum, and a blower for receiving threshed material, said harvesting combine further comprising a second set of elements including a second cleaning and separating mechanism operatively associated with said blower, and a straw cutting, binding and compressing unit having an actuating shaft, and a bagging platform operatively associated with said second cleaning and separating mechanism and having means of support by said harvesting combine and said vehicle, said first set of elements being disposed on one side of said vehicle, said second set of elements and said bagging platform being disposed on the other side of said vehicle and balancing the weight of said first set of elements to distribute the weight of said harvesting combine equally on said axles, and means for driving said conveyers and said actuating shaft from said power take-off shaft.

2. The combination according to claim 1, wherein said harvesting combine further includes a shaker element operatively associated with and disposed intermediate said thresher drum and said straw cutting, binding and compressing unit, actuating means for said shaker element comprised in said means for driving said conveyers and actuating shaft.

3. The combination according to claim 1, wherein said transverse conveyer is disposed rearwardly of said elevator conveyer and said straw-cutting, binding and compressing unit is disposed rearwardly of said bagging platform.

4. The combination with a motor vehicle according to claim 1, further including a driver's seat, said loading platform being behind the driver's seat, said elevator being supported by said frame and adjacent said driver's seat, said transverse conveyer and said thresher drum being supported by said frame, and means for supporting said second cleaning and separating mechanism above and to one side of said driver's seat.

5. The combination according to claim 1, wherein said means for supporting said second cleaning and separating mechanism includes connecting means between said frame and said unit and further includes a wall portion of said vehicle.

6. The combination according to claim 1, further comprising spring means for resiliently supporting said loading platform upon said axles, said combine when mounted for operation on said loading platform being positioned so that the cut grain is passed through said combine in a direction transverse to the driving direction of said vehicle, said combine being of substantially U-shape, as seen in the driving direction of the vehicle, with the opposite arms of said U-shape extending along opposite sides of the vehicle.

7. The combination according to claim 1, wherein said frame comprises two parallel walls, means for supporting said transverse conveyer, said thresher drum and said straw cutting, binding and compressing unit on said parallel walls, said frame having a bottom wall, said means detachably securing said harvesting combine to said loading platform comprising detachable connecting means between said bottom wall and said loading platform.

8. In a combine, the combination according to claim 6, wherein said power take-off shaft is driven by the motor of said motor vehicle.

9. The combination according to claim 1, said reaper and said elevator conveyer when mounted on said loading platform projecting laterally on one side of said vehicle, said means detachably securing said harvesting combine to said loading platform comprising nut and bolt means.

References Cited in the file of this patent
UNITED STATES PATENTS

| | | |
|---|---|---|
| 1,727,616 | Pro | Sept. 10, 1929 |
| 2,278,394 | Walters | Mar. 31, 1942 |
| 2,540,249 | Evers et al. | Feb. 6, 1951 |
| 2,781,625 | Phelps et al. | Feb. 19, 1957 |